United States Patent [19]

Schmidt et al.

[11] 4,238,469
[45] Dec. 9, 1980

[54] PROCESS FOR THE MANUFACTURE OF ALUMINUM FLUORIDE

[75] Inventors: Alfred Schmidt, Vienna; Wilhelm Tschebull, Linz, both of Austria

[73] Assignee: Chemie Linz Aktiengesellschaft, Linz, Austria

[21] Appl. No.: 27,012

[22] Filed: Apr. 3, 1979

[30] Foreign Application Priority Data

Apr. 12, 1978 [DE] Fed. Rep. of Germany ....... 2815881

[51] Int. Cl.$^3$ .............................................. C01F 7/50
[52] U.S. Cl. .................................... 423/489; 423/495
[58] Field of Search ............. 423/489, 495; 159/48 R, 159/DIG. 15

[56] References Cited

U.S. PATENT DOCUMENTS

| 125,406 | 4/1872 | Percy ................................. 159/48 R |
| 3,385,658 | 5/1968 | Broja et al. ........................... 423/489 |

FOREIGN PATENT DOCUMENTS 529602  1/1929  Fed. Rep. of Germany .

OTHER PUBLICATIONS

Bohm et al. "Die Aluminiumfluorid-Synthese als Beispiel für Gas/Feststoff-Reaktionen in expandierten Wirbelschichten", Chem. Ing. Techn., No. 4, 1976 p. 341.
Schmidt, "Herstellung von Aluminiumfluorid als Nebenprodukt der Phosphatdüngemittel-Industrie", Chem. Ing. Techn., 1967, pp. 521-525.

Primary Examiner—Earl C. Thomas
Attorney, Agent, or Firm—Wenderoth, Lind & Ponack

[57] ABSTRACT

Aluminum fluoride with an AlF$_3$ content of at least 96% by weight relative to the anhydrous product is produced by reacting aluminum hydroxide with aqueous fluosilicic acid, removing the precipitated silica, adding hydrofluoric acid in a quantity of 0.1-1% by weight of HF relative to the so produced AlF$_3$ containing solution having an AlF$_3$ content of 20 to 50 percent and atomizing same before the start of crystallization of the aluminum fluoride at temperatures of 110°-350° C. optionally using aluminum fluoride particles as heat transfer agents.

7 Claims, No Drawings

PROCESS FOR THE MANUFACTURE OF ALUMINUM FLUORIDE

The subject of the present invention is a process for the manufacture of aluminum fluoride by reacting aluminum hydroxide with fluosilicic acid in aqueous solution, in which process the long crystallization times for the aluminum fluoride, after filtering off the precipitated silica, which have hitherto been customary are eliminated.

One attempt has already been made to avoid, in isolating aluminum fluoride from its aqueous solutions, the crystallization stage, which is expensive in every respect and is a great hindrance to carrying out the process continuously. This attempt forms the subject of German Patent Specification No. 529,602 of 1929. In this process, starting from alumina hydrate and hydrofluoric acid, a solution containing aluminum fluoride is discharged into a rotary tubular oven and the crystallization, the removal of the bulk of the water and the calcination of the aluminum fluoride until it is virtually free from water of crystallization are carried out in one operation. In the absence of defined evaporation, drying and calcination conditions, an end product with a purity of only 93% is obtained, which is produced in lumps and does not meet present-day requirements.

The U.S. Pat. No. 3,385,685 describes a process for the continuous preparation of aluminum flouride from hydrated aluminum oxides and hydrofluoric acid which comprises mixing and reacting hydrated aluminum oxide and aqueous hydrofluoric acid in a concentration to maintain an HF concentration in the reaction mixture between 50 to 80 percent which corresponds to an $AlF_3$-concentration of at least 70 percent and solidifying the reaction product on a moving bed of solid granules of aluminum fluoride. Such high HF-concentrations can only be reached by using even higher concentrations of hydrofluoric acid.

Such high concentrations of fluorine-ion cannot be reached in solutions obtained in a process for preparing aluminum fluoride solutions by reaction of aluminum hydroxide with aqueous fluosilicic acid.

Another more modern process also starts from aluminum hydroxide and hydrofluoric acid, $Al_2O_3$ being first prepared from $Al(OH)_3$ in a two-stage fluidized bed process, thereby avoiding an aqueous reaction phase, and anhydrous $AlF_3$ being obtained from the $Al_2O_3$ at temperatures of 400°–600° C. in an atmosphere of HF. (Chem. Ing. Techn. 48th year of publication, 1976/No. 4, page 341). Here too, however, in spite of the controllable experimental conditions, it is not possible to obtain product qualities purer than 90 to 92% of $AlF_3$, such as are indicated. On the other hand, no process is known in which a solution originating from the reaction of fluosilicic acid with aluminum hydroxide is processed to give aluminum fluoride with the avoidance of the aqueous crystallization stage, since the necessity of removing the silica, and the residual Si content of the solution form an additional difficulty in this case.

It has now been possible, surprisingly, to find that an aluminum fluoride solution prepared by reaction of aluminum hydroxide with fluosilicic acid can, while avoiding the crystallization stage, which is known to be tedious, be converted directly and in a quantitative yield into an aluminum fluoride which meets the specifications both in respect of $AlF_3$ content and of Si content, if, after removing silica, the solution is rapidly evaporated by atomization, care being taken at the same time that there is a certain content of hydrogen fluoride in the solution to be atomized. The success of this rapid drying process by atomization could not have been foreseen by those skilled in the art, since, on the one hand, it is known that the great delay in the crystallization of $AlF_3.3H_2O$ is due to the fact that in a time reaction aluminum fluoride first has to form, in the solution, from a number of soluble Al-F compounds (Chem. Ing. Technik 39, 1967, 522) and, in addition, the bulk of the Si content of the solution is due to a content of aluminum silicofluoride, which would not have been expected to be smoothly removable.

The subject of the invention is, therefore, in a process for preparing substantially pure solid aluminum fluoride containing water of crystallization and with an $AlF_3$ content of at least 96 percent per weight, relative to the anhydrous product, from an aqueous solution obtained by reacting aluminum hydroxide with aqueous fluosilicic acid and separating the solution so formed from silica, precipitated during reaction, which comprises adding to said aqueous solution, having an $AlF_3$ content from 20 up to 50 percent per weight, gaseous HF or an aqueous solution of HF in an amount of 0.1–1 percent per weight of HF, relative to the aqueous solution and thereafter and before occurrence of $AlF_3$ crystallization atomizing said solution at temperatures from 110° to 350° C. and under drying conditions. Preferably the atomizing step is carried out in presence of a moved bed of aluminum fluoride particles, the particles then being heated to the temperature chosen for the atomizing step within the range of 110°–350° C.

The selection of the reaction temperature within the limits according to the invention depends on the desired water content of the end product. If it is desired to relieve the load on the subsequent calcination greatly, it is advisable to carry out the reaction at temperatures of, for example, 250°–300° C., by means of which the water content can be reduced to about 5%. If a water content higher than, for example, 10–15% can be tolerated, it will be appropriate to select a somewhat lower product temperature, above all if fairly dilute solutions are used as starting material, since otherwise fairly large proportions of relatively fine-grained material are sometimes formed.

A particularly high $AlF_3$ content and good particle size distribution are achieved if a product temperature of 110°–200° C. is maintained. If the starting solution is a diluted one, having for instance 20–30 percent $AlF_3$-content, it is appropriate—but not necessary—to remove part of the water in the solution containing aluminum fluoride before the atomizing process according to the invention, at temperatures between 30° and 70° C. in vacuo, in the course of which no aluminum fluoride crystallizes out. This is because it has been found that, depending on the temperature during atomization, the water vapor removed under normal pressure in this atomizing stage according to the invention promotes the formation of very finely divided aluminum fluoride, which in certain circumstances is not desirable. Moreover, the step of carrying out a prior vacuum evaporation means a lower outlay on apparatus in comparison with the customary crystallization and filtration stages. Preferred concentrations after vacuum evaporation are 35–50 percent $AlF_3$.

In accordance with the invention 0.1–1% by weight, preferably 0.1–0.5% by weight, of hydrofluoric acid in the customary aqueous solutions is added to the solution containing aluminum fluoride before the atomising stage, in order to reduce the "SiO₂ content" in the end product below the permissible maximum, which is customarily 0.2% of SiO₂. This step, too, is in no way obvious.

The atomising process according to the invention can and should also be carried out as rapidly as possible, for example by injecting into a stream of air which has been warmed to the temperature range according to the invention, it being possible to deposit the solid aluminum fluoride in a cyclone. It is also possible, in granulating devices of very diverse design, to use aluminum fluoride granules as heat transfer agents, that is to say the solution containing aluminum fluoride is sprayed onto the granules which have been previously introduced, in such a way that the formation of a liquid phase is prevented. Injecting the solution containing aluminum fluoride, which if necessary has previously been evaporated in vacuo, into a fluidized bed consisting of finely divided aluminum fluoride prepared by the process according to the invention has also proved suitable.

As far as the content of other impurities, such as "P₂O₅" or "Fe", in the end product is concerned, no problems at all arise on this account, since aqueous fluosilicic acid solutions are obtainable in a state of adequate purity, even on a large manufacturing scale. (Fe₂O₃ about 70 mg/l; P₂O₅ below 50 mg/l). Additional advantages of the process according to the invention are the fact that it can be carried out continuously, which is very much facilitated by avoiding the encrustation problems characteristic for aluminum fluoride trihydrate, and also the fact that the aluminum fluoride present in the solution is obtained quantitatively, which constitutes a great advantage, particularly if an H₂SiF₆ containing much chloride is used, which customarily enables only a low yield of AlF₃ to be achieved.

The examples which follow are intended to illustrate the process according to the invention in greater detail.

EXAMPLE 1

An aluminum fluoride solution containing 20.5% by weight of AlF₃ and 0.1% by weight of SiO₂ was first prepared by digesting aluminum hydroxide with stoichiometric quantities of technical fluosilicic acid (45 ppm of P₂O₅, 10 g/l of Cl⁻ and 15.3% by weight of F) and filtering off the silica precipitated. This solution was concentrated in vacuo at 40° C. to an AlF₃ content of about 47% by weight, without solid aluminum fluoride being formed. After adding 0.27% by weight of HF in the form of a 40% strength solution, relative to the concentrate (0.2% by weight of HF relative to the original AlF₃ solution), 3,820 parts by weight of this concentrate were added dropwise continuously to 1,700 parts by weight per hour of granulated aluminum fluoride hydrate (15% loss on ignition), previously placed in an externally heated continuous paddle mixer at such a rate that the quantity of water thus introduced was evaporated immediately. The temperature of the aluminum fluoride in the continuous paddle mixer was adjusted to 110° C. by controlling the external heating. 3,900 parts by weight per hour of aluminum fluoride hydrate granules with a loss on ignition of 16.5% by weight were obtained at the outlet of the mixer, that is to say 99.8% by weight of the aluminum fluoride introduced were found in the granules. At the same time, it was not possible to find more than insignificant quantities of fine dust in the gas extraction system. A proportion of the granules was recycled to the mixer after being partially comminuted. The remainder was calcined in an indirectly heated rotary tubular oven at 550° C. to give anhydrous AlF₃. The aluminum fluoride, which was produced in a uniform particle size (0.25–0.8 mm), had a loss on ignition of 0.4% and contained 97.3% by weight of AlF₃, 0.02% by weight of Cl, 0.02% of P₂O₅ and less than 0.02% by weight of "SiO₂".

EXAMPLE 2

After adding 0.12% by weight of HF in the form of a 40% strength solution, an aluminum fluoride solution prepared as in Example 1 was applied direct, without prior concentration, at 110° C. to previously taken AlF₃ granules in the manner described above and was evaporated. In this case, about 7% by weight of the aluminum fluoride introduced were found as dust in the gas extraction equipment. The proportion of the AlF₃ in the granules was thus 93% by weight, the quality of the calcined AlF₃ being the same as above.

EXAMPLE 3

After adding 0.12% by weight of HF in the form of a 40% strength solution, an AlF₃ solution prepared as in Example 1 was applied at 200° C. to previously taken AlF₃ granules in the manner described above and was evaporated. The quality of the calcined AlF₃ was the same, but the proportion of AlF₃ in the granules was only 70% by weight, the residual fraction being deposited in the gas extraction system in a very finely divided form (5–30μ). It can be recycled to the granulation stage or employed as a heat transfer agent in a fluidized bed.

EXAMPLE 4

An AlF₃ solution prepared by digesting aluminum hydroxide with technical grade H₂SiF₆ (a 2% stoichiometric excess of H₂SiF₆) and filtering off the silica precipitated, contained 21% by weight of AlF₃ and 2.6 g of SiO₂/l. After adding 0.4% by weight of HF in the form of a 40% strength solution, 100 parts by weight of this solution were added, with continuous granulation, to 50 parts by weight of coarsely crystalline AlF₃ hydrate (containing 0.1% by weight of SiO₂), a temperature of 150° C. being maintained in the product by external heating with gas. The AlF₃ hydrate thus prepared exhibited a loss on ignition of 9.8% by weight and contained, after calcination at 550° C., 97.2% of AlF₃ and 0.2% by weight of "SiO₂".

AlF₃ prepared in the same manner, with the addition of 0.12% by weight of HF in the form of a 40% strength solution, still contained 0.24% by weight of "SiO₂" after calcination.

EXAMPLE 5

An AlF₃ solution prepared by digesting Al(OH)₃ with technical grade H₂SiF₆ (a 2% stoichiometric excess of H₂SiF₆) and filtering off the silica precipitated, contained 21% by weight of AlF₃ and 2.6 g of "SiO₂"/l. After adding 0.4% by weight of HF in the form of an aqueous solution, 200 parts by weight of the AlF₃ solution were added, with continuous granulation, to 50 parts by weight of coarsely crystalline AlF₃ hydrate (containing 0.1% by weight of SiO₂), a temperature of 300° C. being maintained in the product by external heating with gas. The AlF₃ hydrate thus prepared exhibited a loss on ignition of 4.7% by weight and contained, after calcination at 550° C., 96.5% of AlF₃ and 0.11% by weight of "SiO₂".

EXAMPLE 6

An AlF$_3$ solution prepared from Al(OH)$_3$ and a solution of H$_2$SiF$_6$ contained 248 g/l of AlF$_3$, 56 mg/l of P$_2$O$_5$ and 1.04 g/l of SiO$_2$. After adding 0.15% by weight of HF in the form of a 40% strength aqueous solution, 1.4 l/hour of this solution were dried by atomization in a stream of air (10 Nm$^3$/hour) with an inlet temperature of 540° C. and an outlet temperature of 140° C., and the product was then separated in a cyclone. It contained 19.4% of H$_2$O. After further calcination at 600° C. in a fluidized bed, the product contained 98.1% of AlF$_3$ and 0.02% of P$_2$O$_5$. The SiO$_2$ content was 0.2%.

EXAMPLE 7

After adding 0.15% by weight of HF in the form of a 40% strength aqueous solution, 1.0 l/hour of an aluminum fluoride solution of the same type as described in Example 1 was introduced by spraying, with the aid of a two-material nozzle, together with air into a fluidized bed, with a diameter of 200 mm and a height of 150 mm, consisting of aluminum fluoride. The temperature of the fluidized bed was 150° C., the heat required being supplied by external electrical heating. The level in the fluidized bed was kept constant by means of an overflow. The exhaust gases from the bed were passed over a cyclone and the solid product precipitated there was recycled to the fluidized bed.

It was possible to obtain 295 g of product per hour, with a water content of 18.2%. After the product had been calcined in a fluidized bed at 600° C., it contained 99.2% of AlF$_3$. The SiO$_2$ content was 0.2%.

What we claim is:

1. A process for preparing substantially pure solid aluminum fluoride containing water of crystallization and with an AlF$_3$ content of at least 96 percent per weight, relative to the anhydrous product, from an aqueous solution obtained by reacting aluminum hydroxide with aqueous fluosilicic acid and separating the solution so formed from silica, precipitated during reaction, which comprises adding to said aqueous solution, having an AlF$_3$ content from 20 up to 50 percent per weight, gaseous HF or an aqueous solution of HF in an amount of 0.1-1 percent per weight of HF, relative to the aqueous solution and thereafter and before occurrence of AlF$_3$ crystallisation atomizing said solution at temperatures from 110° to 350° C. and under drying conditions.

2. A process according to claim 1, in which the atomizing step is carried out at 110° to 200° C.

3. A process according to claim 1, in which the HF is added in an amount of 0.1-0.5% by weight of HF.

4. A process according to claim 1, in which the atomizing step is carried out in presence of a moved bed of aluminum fluoride particles, the particles being heated to the temperature of the atomizing step.

5. A process according to claim 4, in which the atomizing step is carried out in a granulation stage.

6. A process according to claim 4, in which the atomizing step is carried out in a fluidized bed stage.

7. A process as claimed in claim 1, in which the aqueous solution of aluminum fluoride having a concentration within the range of 20-30 percent AlF$_3$ is evaporated in vacuo at 30°-70° C. in order to obtain an aqueous solution of a concentration of 35-50 percent per weight of AlF$_3$ before HF is added.

* * * * *